United States Patent
Keller et al.

(10) Patent No.: US 10,298,032 B2
(45) Date of Patent: May 21, 2019

(54) PROTECTIVE DEVICE FOR A PLUG-IN ELECTRIC VEHICLE, CHARGING PLATE, HIGH-VOLTAGE LINE AND PLUG-IN ELECTRIC VEHICLE

(71) Applicant: Dr. Ing. h.c. F. Porsche Aktiengesellschaft, Stuttgart (DE)

(72) Inventors: Ralf Keller, Niefern-Oeschelbronn (DE); Philipp Neurath, Leonberg (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 208 days.

(21) Appl. No.: 14/804,413

(22) Filed: Jul. 21, 2015

(65) Prior Publication Data

US 2016/0036253 A1 Feb. 4, 2016

(30) Foreign Application Priority Data

Jul. 29, 2014 (DE) .................. 10 2014 110 669

(51) Int. Cl.
| | |
|---|---|
| H02J 7/00 | (2006.01) |
| B60L 11/18 | (2006.01) |
| B60L 3/00 | (2019.01) |
| H02J 7/02 | (2016.01) |
| H02J 50/10 | (2016.01) |

(52) U.S. Cl.
CPC .......... *H02J 7/0029* (2013.01); *B60L 3/0023* (2013.01); *B60L 11/182* (2013.01); *B60L 11/1816* (2013.01); *B60L 11/1838* (2013.01); *H02J 7/025* (2013.01); *H02J 50/10* (2016.02); *Y02T 10/7005* (2013.01); *Y02T 10/7072* (2013.01); *Y02T 90/122* (2013.01); *Y02T 90/14* (2013.01)

(58) Field of Classification Search
CPC ....... H02J 7/025; H02J 50/00; B60L 11/1829; Y02T 90/14
USPC .................. 320/108, 109; 307/104
See application file for complete search history.

(56) References Cited

U.S. PATENT DOCUMENTS

| | | | | |
|---|---|---|---|---|
| 5,710,502 | A | * 1/1998 | Poumey | B60L 11/182 320/108 |
| 2009/0122579 | A1 | * 5/2009 | Senaj | H02M 3/335 363/21.04 |
| 2011/0273137 | A1 | 11/2011 | Nakatsuji et al. | |
| 2014/0015328 | A1 | 1/2014 | Beaver et al. | |
| 2014/0253278 | A1 | 9/2014 | Elias et al. | |

FOREIGN PATENT DOCUMENTS

| | | |
|---|---|---|
| CN | 102910082 A | 2/2013 |
| DE | 10 2011 116 250 | 4/2013 |
| KR | 1020110073108 A | 6/2011 |

OTHER PUBLICATIONS

Korean Office Action dated Sep. 30, 2016.
German Search Report dated Oct. 6, 2014.
Chinese Office Action dated Oct. 10, 2018.

\* cited by examiner

*Primary Examiner* — Zixuan Zhou
(74) *Attorney, Agent, or Firm* — Gerald E. Hespos; Michael J. Porco; Matthew T. Hespos

(57) ABSTRACT

A protective device (28) is provided for a plug-in electric vehicle having a charging plate (22) and a traction battery (26). The protective device (28) has a diode that includes an anode for connecting the diode to the charging plate (22) and a cathode for connecting the diode to the traction battery (26). A charging plate, a high-voltage line and a plug-in electric vehicle having such a protective device also are provided.

18 Claims, 1 Drawing Sheet

PROTECTIVE DEVICE FOR A PLUG-IN ELECTRIC VEHICLE, CHARGING PLATE, HIGH-VOLTAGE LINE AND PLUG-IN ELECTRIC VEHICLE

CROSS REFERENCE TO RELATED APPLICATION

This application claims priority under 35 USC 119 to German Patent Appl. No. 10 2014 110 669.5 filed on Jul. 29, 2014, the entire disclosure of which is incorporated herein by reference.

BACKGROUND

1. Field of the Invention

The invention relates to a protective device for a plug-in electric vehicle having a charging plate and a traction battery. The invention also relates to a charging plate, a high-voltage line and a plug-in electric vehicle having such a device.

2. Description of the Related Art

Electric vehicle is understood to mean any mode of transport that is driven using electrical energy. Road vehicles of this type also are referred to as electric motor vehicles. Electric motor vehicles with traction batteries that can be charged via an external power supply system are referred to as plug-in electric vehicles (PEV). The attribute plug-in is understood to be an option and does not imply the necessity of a plug-in connection for charging the plug-in electric vehicle.

The prior art includes systems for inductively charging generic plug-in electric vehicles. Such a system comprises a permanently installed primary unit having a primary coil and power electronics. The primary unit is connected electrically to a stationary power supply system. In addition, the system comprises a secondary unit on the vehicle having a secondary coil and further power electronics. The vehicle is arranged with respect to the primary unit so that the secondary coil is brought into the vicinity of the primary coil. As a result, the primary and secondary coils form a transformer with a small air gap. Thus, energy can be transferred inductively from the primary unit to the secondary unit, that is to say from the stationary power supply system to the traction battery of the vehicle.

The secondary unit on the vehicle is a high-voltage-conducting circuit, and, like all other high-voltage components in the vehicle, must be made safe even in the event of a vehicle crash, despite the expense of protective measures. Otherwise, high voltages could lead to dangerous effects after a vehicle crash.

SUMMARY

The invention provides a protection device for a plug-in vehicle with a charging plate and a traction battery. The protective device includes and diode with anode for connecting the diode to the charging plate and a cathode for connecting the diode to the traction battery. Thus, the invention provides a particularly simple and inexpensive protection of the vehicle in the event of a crash.

The diode can be embedded in a circuit that connects the diode to the plug-in electric vehicle only during driving. This configuration is based on the discovery that the charging plate is disconnected from the high voltage when the vehicle is travelling because inductive charging is possible only when the vehicle is stationary.

The diode can be integrated in the charging plate or inserted in the high-voltage lines between charging plate and traction battery. Two substantially equivalent configuration options are therefore open to the manufacturer, thereby enabling the manufacturer to use a conventional high-voltage line or to use a conventional traction battery with the adaptation of the respective other component.

The protective device may be integrated in a generic plug-in electric vehicle. The expenditure for protecting the high-voltage-conducting circuit, which is necessary in conventional plug-in electric vehicles and is measured based on the package, weight and costs, can be reduced significantly in this way.

The charging plate may be arranged in front of the electric motor of the plug-in electric vehicle, and the motor is fed from the traction battery. This position proves to be the most optimum installation location already in the case of a plug-in hybrid electric vehicle (PHEV) from technical viewpoints.

The use of a diode is not only meaningful in the case of inductive charging systems, but also in the case of contact-making so-called on-board charging devices (OBL) or charging sockets for stationary charging stations.

An exemplary embodiment of the invention is illustrated in the drawings and is described in more detail below.

DETAILED DESCRIPTION

Figure 1:
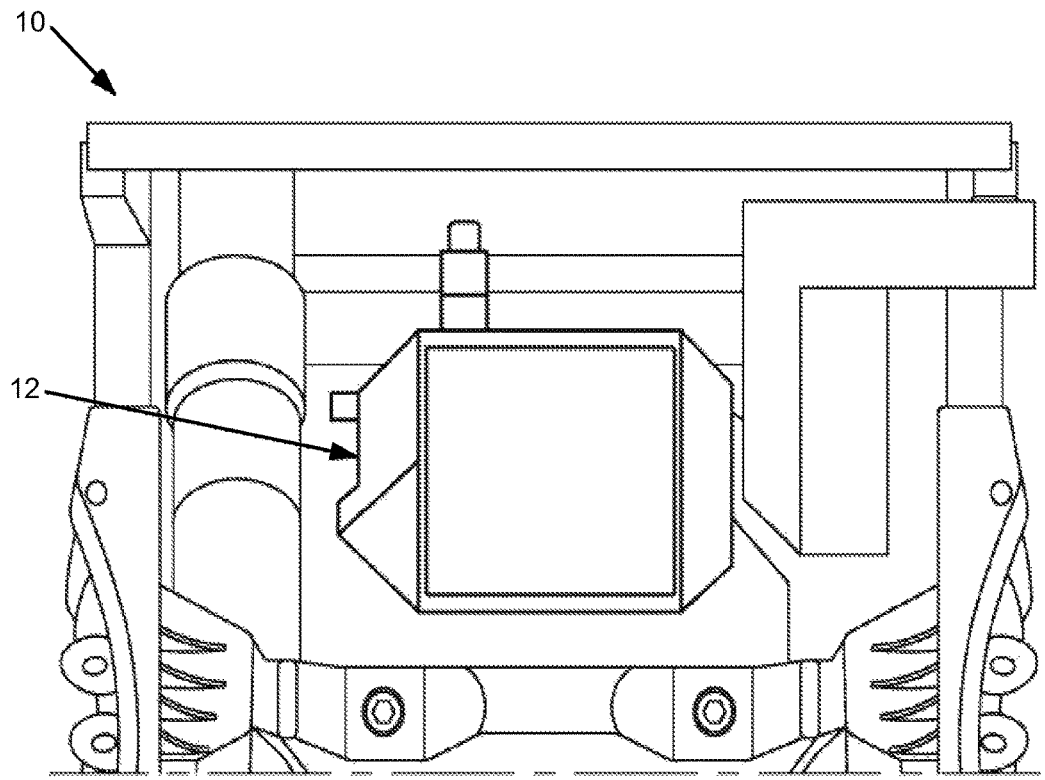
FIG. 1 shows the envisaged installation position of a charging plate according to an embodiment of the invention.

FIG. 1 illustrates the optimum installation position of a charging plate 12, 22 in a plug-in electric vehicle 10, which, for reasons of clarity, is illustrated only in sections in the region of the engine space thereof in FIG. 1. The vehicle 10 is specifically a plug-in hybrid electric vehicle and thus has an additional internal combustion engine for driving the vehicle or for charging the traction battery.

The charging plate 12 is in front of the electric motor and applies an electric charging current to inductively charge the traction battery that feeds the electric motor. For this purpose, the charging plate 12 gas the secondary coil of an inductive charging system, in addition to appropriate power electronics, and thus acts as the secondary unit thereof. If the plug-in electric vehicle 10 is positioned suitably relative to the primary unit of the inductive charging system, the secondary unit embodied by the charging plate 12 can interact with the permanently installed primary unit for the purpose of the charging process.

Figure 2:
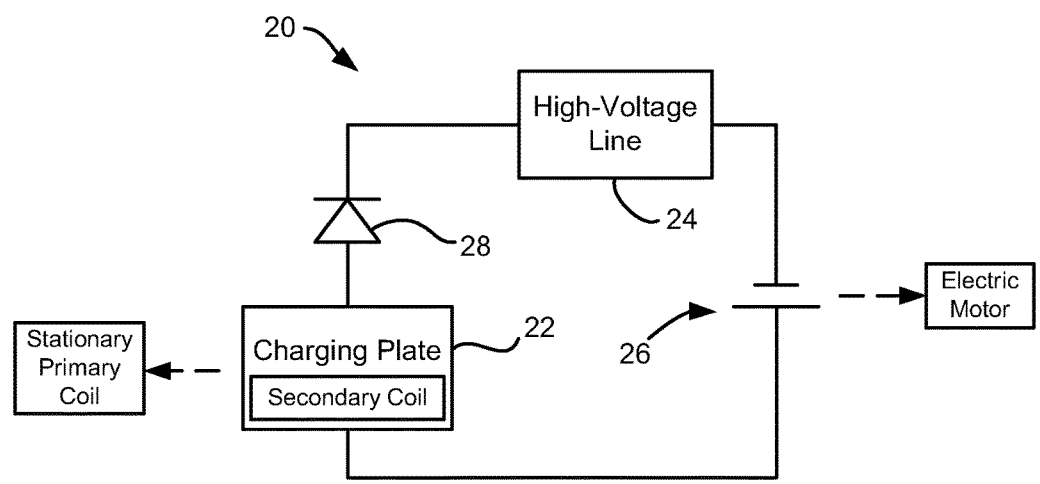
FIG. 2 shows the simplified circuit diagram of the high-voltage-conducting circuit of a plug-in electric vehicle according to an embodiment of the invention.

FIG. 2 shows the simplified circuit diagram of the high-voltage-conducting circuit 20 of the plug-in electric vehicle 10. The high-voltage line 24 for conducting the charging current leading from the charging plate 22 to the traction battery 26 is symbolized merely by its line resistance in FIG. 1 for the purpose of simplification.

A protective device 28 is connected in series between the charging plate 22 and the high-voltage line 24. Regardless of the schematic illustration in FIG. 2, the protective device 28 can be integrated completely in the charging plate 22 or in the high-voltage line 24 without departing from the scope of the invention.

In each case, the protective device 28 comprises a diode or corresponding circuit that actively prevents a return-flow of the charging current from the traction battery 26 to the charging plate 22 due to the illustrated forward direction of the diode or circuit. In this connection, the anode of the diode is connected electrically to the charging plate 22 and the corresponding cathode is connected to the traction battery 26.

What is claimed is:

1. A plug-in electric vehicle comprising:
   an electric motor;
   a traction battery configured to power the electric motor during a driving operation of the plug-in electric vehicle;
   a charging plate including at least a secondary coil of an inductive charging system; and
   a diode including an anode connected directly to the charging plate and a cathode connected to the traction battery;
   wherein the secondary coil of the charging plate is configured to interact with a stationary primary coil of the inductive charging system when the plug-in electric vehicle is suitably positioned relative to the stationary primary coil;
   wherein the inductive charging system is configured to inductively charge the traction battery when the secondary coil interacts with the stationary primary coil; and
   wherein the diode enables a current flow from the secondary coil of the charging plate to the traction battery when the plug-in electric vehicle is suitably positioned relative to the stationary primary coil, but prevents a current flow from the traction battery to the charging plate during driving.

2. The plug-in electric vehicle of claim 1, wherein the diode is integrated in the charging plate.

3. The plug-in electric vehicle of claim 1, wherein the charging plate is arranged in front of the electric motor.

4. The plug-in electric vehicle of claim 1, wherein the diode is configured as a protective device for protecting the plug-in electric vehicle in the event of a crash.

5. A high-voltage circuit of a plug-in electric vehicle, the high-voltage circuit comprising:
   a traction battery configured to power an electric motor of the plug-in electric vehicle during a driving operation of the plug-in electric vehicle;
   a charging plate including at least a secondary coil of an inductive charging system; and
   a diode including an anode connected directly to the charging plate and a cathode connected to the traction battery;
   wherein the secondary coil of the charging plate is configured to interact with a stationary primary coil of the inductive charging system when the plug-in electric vehicle is suitably positioned relative to the stationary primary coil;
   wherein the inductive charging system is configured to inductively charge the traction battery in a charging operation of the plug-in electric vehicle by means of an electrical charging current when the secondary coil interacts with the stationary primary coil; and
   wherein the diode enables a current flow from the secondary coil of the charging plate to the traction battery when the plug-in electric vehicle is suitably positioned relative to the stationary primary coil, but prevents a current flow from the traction battery to the charging plate during driving.

6. The high-voltage circuit of claim 5, wherein the diode is integrated in the charging plate.

7. The high-voltage circuit of claim 5, wherein the diode is configured as a protective device for protecting the plug-in electric vehicle in the event of a crash.

8. The high-voltage circuit of claim 5, wherein the charging plate is arranged in front of the electric motor.

9. The high-voltage circuit of claim 5, further comprising a high-voltage line for conducting the electrical charging current from the charging plate to the traction battery.

10. The high-voltage circuit of claim 9, wherein the diode is integrated in the high-voltage line.

11. The high-voltage circuit of claim 5, wherein the charging plate includes power electronics configured to control the charging operation.

12. A protective device of a plug-in electric vehicle, the protective device comprising:
    a charging plate including at least a secondary coil of an inductive charging system; and
    a diode including an anode connected directly to the charging plate and a cathode connected to a traction battery configured to power an electric motor of the plug-in electric vehicle during a driving operation of the plug-in electric vehicle;
    wherein the secondary coil of the charging plate is configured to interact with a stationary primary coil of the inductive charging system when the plug-in electric vehicle is suitably positioned relative to the stationary primary coil;
    wherein the inductive charging system is configured to inductively charge the traction battery during a charging operation of the plug-in electric vehicle; and
    wherein the diode enables a current flow from the secondary coil of the charging plate to the traction battery when the plug-in electric vehicle is suitably positioned relative to the stationary primary coil, but prevents a current flow from the traction battery to the charging plate during driving.

13. The protective device of claim 12, wherein the diode is integrated in the charging plate.

14. The protective device of claim 12, wherein the diode is configured to protect the plug-in electric vehicle in the event of a crash.

15. The protective device of claim 12, wherein the charging plate is arranged in front of the electric motor.

16. The protective device of claim 12, further comprising a high-voltage line for conducting an electrical charging current from the charging plate to the traction battery.

17. The protective device of claim 16, wherein the diode is integrated in the high-voltage line.

18. The protective device of claim 12, wherein the charging plate includes power electronics configured to control the charging operation of the plug-in electric vehicle.

* * * * *